United States Patent Office 3,440,224
Patented Apr. 22, 1969

3,440,224
POLYURETHANE COMPOSITIONS AND
METHODS FOR PREPARING SUCH
Clarence N. Impola, Prior Lake, and William J. McKillip,
Minneapolis, Minn., assignors to Ashland Oil & Refining Company, Ashland, Ky., a corporation of Kentucky
No Drawing. Filed Mar. 15, 1966, Ser. No. 534,433
Int. Cl. C08g 22/04, 51/40
U.S. Cl. 260—77.5        11 Claims

ABSTRACT OF THE DISCLOSURE

Polyurethane compositions of higher flexural strength are prepared by adding to isocyanate-terminated prepolymer compositions, obtained by reacting a polyhydric polyalkylene ether with an excess of an organic polyisocyanate, either before or after the formation of the prepolymer, from 10 to 16% by weight of the total composition of a hydrocarbon ester of a completely esterified polybasic acid, said ester being liquid at room temperature and boiling above 200° C.

---

This invention relates to improved polyurethanes derived from polyethers and to methods of producing such improved polyurethane resin compositions.

Polyurethanes, obtained by the polymerization of polyisocyanate compositions, form highly useful coating and laminating resins. In preparing such coating and laminating resins, an excess of a polyisocyanate is reacted with, preferably, a polyhydric polyether or polyester to form an isocyanate-terminated prepolymer. This prepolymer, to which, frequently, a polyol having three or more hydroxyl groups is added as a cross-linking agent, is combined with solvent and other coating additives to make up the coating composition. The coating composition is applied to the substrate to be coated and the contact of the coating with the moisture of the air causes further polymerization of the isocyanate-terminated prepolymer to a cured product. On evaporation of the solvent and complete reaction of the isocyanate groups, a tough, solid coating is obtained.

The polymerization of the isocyanate-terminated prepolymer to the final coating can be greatly accelerated by the addition of tertiary amines which act as catalysts for the further polymerization of the isocyanate groups with hydroxyl groups, by the addition of water which results in urea linkages between the isocyanate groups, or by the addition of both water and the tertiary amines. Ordinarily, free water is not added but a moisture cure is obtained by reaction with moisture in the air. The addition of both water and a tertiary amine causes the curing reaction to become very rapid and much faster than the evaporation of the solvent necessary to have a flowable coating composition. Retention of the solvent by the cured coating adversely affects the properties of the coating as does evaporation of solvents subsequent to curing. It would, therefore, appear to be desirable to replace the solvent which must be removed from the polymer composition in its coating and/or laminating applications at least in part with a material which would not require evaporation but which, nevertheless, would result in such fluidity in the prepolymer composition as is necessary for the application of such prepolymer compositions in coating and laminating uses.

One type of material which has been heretofore suggested as an additive to polyurethane compositions is a liquid plasticizer boiling above 200° C. The term "plasticizer," as employed in such art, is meant to define the general class of compounds heretofore employed as plasticizers for vinyl resins, such as polyvinyl chloride. Such plasticizers aid in the processing of the vinyl resin to which they are added and also are retained by the resin during and after fabrication. It is well-known, however, that the addition of plasticizers to polyurethane increases the flexibility of the cured polyurethane product and in addition to increasing the flexibility, causes a proportionate loss in tensile strength, elongation, and tear strength. In view of this effect, such plasticizers have not found significant utility in polyurethane coating and laminating compositions since the value of polyurethane coating and laminating composition resides in their superior mechanical properties as compared to other coating and laminating compositions.

It is an object of the present invention to provide modified polyurethane coating and/or laminating compositions which are less viscous than the corresponding unmodified polyurethane compositions.

It is a further object of the present invention to provide additive-containing polyurethane compositions in which the additive, while lowering the viscosity of the uncured polyurethane, improves the mechanical properties of the polyurethane on curing at room temperature and on exposure to the atmosphere without requiring an increased degree of crosslinking.

It is another object of the present invention to provide additives for curable polyurethane compositions which need not be removed during the curing step.

Still another object of the present invention is to provide a method for preparing improved polyurethane compositions.

Yet another object of the present invention is to provide improved air-dried polyurethane coatings and binders.

Other objects and advantages of the present invention will become apparent from the following description and claims.

The polyurethane compositions of the present invention are obtained by adding a hydrocarbon ester of a completely esterified polybasic acid, said ester having a boiling point above 200° C. and being liquid at room temperature, in nonplasticizing concentrations, to an isocyanate-terminated polyurethane prepolymer, or, preferably, to a mixture of a polyhydric polyalkylene ether and excess polyisocyanate capable of forming such.

The present invention is based on the discovery that hydrocarbon esters of completely esterified polybasic acids, liquid at room temperature and having boiling points above 200° C. and preferably esters of polycarboxylic aromatic acids meeting these requirements, when employed in nonplasticizing concentrations increase the mechanical properties of air-dried polyurethane coating and laminating compositions which are based on isocyanate-terminated polyurethane prepolymers derived from polyhydric polyalkylene ethers. Thus, it was discovered that the addition of small amounts of esters to isocyante-terminated prepolymers derived from polyhydric polyalkylene ethers increases the mechanical properties of the resulting air-dried polyurethane without causing plasticization of such polyurethane. With increasing concentrations of the ester, the improvement in mechanical properties is increased to a maximum and thereafter declines rapidly to below the mechanical properties of the unmodified polyurethane compositions. It is clear that the decrease in mechanical properties observed after the maximum is reached is caused by the plasticizing action of the ester. Although the improvement in mechanical properties may be accomplished by increasing the number of cross-links in the cured composition, such is generally not desirable in view of the increased instability of the uncured coating composition which results from providing additional cross-linking sites. The esters employed in the compositions of the present invention improve the properties without adversely affecting the stability of the uncured polymer composition.

Statements made in the literature regarding the use of plasticizers which are of the esters type employed in the present invention are very general and include ranges of 20 to 80 percent by weight of the polymer composition. However, closer analysis shows that plasticizer concentrations actually employed are generally within the range of 30 to 60 percent. It is in this range that plasticization characterized by lowering of tensile properties is also observed in combinations of polyurethanes and the esters employed in the present invention. The improvement in mechanical properties observed with the compositions of the present invention occurs at concentrations below 30 percent by weight of the polymer composition and, more specifically, optimum properties are obtained at ester concentrations of about 5 to 20 percent based on the weight of the modified polyurethane compositions, as described hereinafter in greater detail. The reason for achieving the improvement in mechanical properties in the polyurethane compositions of the present invention, where normally a decrease would be expected, is not clearly understood but is believed to be caused by interaction between the ester and the polyhydric polyalkylene ether employed in forming the isocyanate-terminated prepolymer. It is conceivable that the interaction is of the hydrogen bonding type, which is not pronounced so long as the polymer composition exists in the fluid state, but causes a type of ionic crosslinking in the solid state. In this regard, it should be pointed out that the addition of the ester modifier to the isocyanate-terminated prepolymer in accordance with the present invention increases the fluidity of the resulting liquid composition and thereby reduces the amount of solvent necessary to achieve any desired viscosity for a particular coating or laminating application.

The esters employed as modifiers in the compositions of the present invention are hydrocarbon esters of completely esterified polybasic acids, which are liquid at room temperature and have boiling points above 200° C. The term "completely esterified" is meant to define a degree of esterification such that unreacted hydroxyl or carboxylic acid groups remaining in the ester are present in insufficient concentration to affect the reaction of the polyalkylene ether with the polyisocyanate and the properties of the resulting prepolymer. In general, the esters have acid and hydroxyl values below 5 and, preferably, no measurable hydroxyl values and acid values of less than 1. Although esters of noncarboxylic acids, such as triaryl and trialkyl esters of phosphorus acids can be employed, it is preferable to employ carboxylic acid esters and, more particularly, esters of aromatic carboxylic acids. The carboxylic acids employed can contain one or more halogens. Suitable esters of aliphatic acids include: alkyl, cycloalkyl, aryl, aralkyl, and alkaryl esters of such acids as adipic acid, pimelic acid, suberic acid, azelic acid, sebacic acid, brassylic acid, chlorendic acid, nadic acid, and 1,4-cyclohexanedicarboxylic acid. The preferred aromatic esters are esters of phthalic acid, terephthalic acid, chlorinated phthalic acids, isophthalic acid, hemimellitic acid, trimellitic acid, pyromellitic acid, benzene-pentacarboxylic acid, and naphthalene-14-dicarboxylic acid. Suitable noncarboxylic acid esters include, in particular, phosphates and phosphites. The ester radical can be aliphatic, cycloaliphatic, or aromatic in nature. The ester radical is selected to meet the requirements of the ester as being liquid at room temperature and boiling above 200° C. The preferred ester radicals are alkyl radicals having from 4–16 carbon atoms. Specific examples of esters of polybasic acids include: tricresyl phosphate, tricresyl phosphite, triphenyl phosphate, dibutyl adipate, dicyclohexyl adipate, dibutyl pimelate, dioctyl adipate, diethyl sebacate, dibutyl sebacate, dibutyl chlorendate, and the dioctyl ester of cyclohexane-1,4-dicarboxylic acid. Esters of the preferred aromatic carboxylic acids include: dioctyl phthalate, didecyl phthalate, dicyclohexyl phthalate, ditridecyl phthalate, dioctyl tetrachlorophthalate, trihexyl mellitate, trioctyl mellitate, dioctyl isophthalate, dioctyl terephthalate, trioctyl pyromellitate, and tricyclohexyl hemimellitate.

The polyhydric polyalkylene ethers employed in the formation of the isocyanate-terminated prepolymer are hydroxyl group-containing polyethers having molecular weights generally in the range of about 500–10,000 or more. Suitable polyhydric polyethers include the condensation products of alkylene oxide and condensation products of such oxides with polyols. Alkylene oxides which can be employed include: ethylene oxide, propylene oxide, butylene oxide, amylene oxide, and mixtures thereof. Polyhydric polyalkylene ethers can also be prepared from such starting materials as tetrahydrofuran and epichlorohydrin. Polyhydric polyalkylene ethers can be further prepared from polyhydric alcohols having three or more hydroxyl groups, or mixtures thereof with diols by reaction with alkylene oxides of the type described hereinabove. Suitable polyhydric alcohols include: ethylene glycol, 1,3-propylene glycol, 1,2-propylene glycol, 1,4-butylene glycol, 1,2-butylene glycol, 1,5-pentane diol, 1,4-pentane diol, 1,6-hexane diol, 1,7-heptane diol, glycerol, trimethylolpropane, 1,3,6-hexane triol, triethanolamine, 1,2,5,6-hexane tetrol, 1,2,7,8-octane tetrol, 2,2,6,6-tetramethylolcyclohexanol, pentaerithritol, and mixtures thereof. Particularly preferred in the compositions of the present invention are those polyhydric polyalkylene ethers having hydroxyl number above 450 and, more particularly, those having such hydroxyl numbers which are prepared from 2,2,6,6-tetramethylolcyclohexanol. In general, from about 5 to 100 mols of alkylene oxide are condensed per mol of the trihydric or higher polyhydric alcohol.

The polyhydric polyalkylene ether is condensed with excess polyisocyanate to result in the isocyanate-terminated prepolymer. The polyisocyanate excess is at least such that there are from 1.5 to 3 isocyanate groups for each hydroxyl group of the polyether. Polyisocyanates condensed with the described reactive materials include: ethylene diisocyanate, propylene-1,2-diisocyanate, tetramethylene diisocyanate, hexamethylene diisocyanate, cycloexylene-1,2-diisocyanate, m-phenylene diisocyanate, 2,4-toluylene diisocyanate, 2,6-toluylene diisocyanate, 3,3-dimethyl-4,4-biphenylene diisocyanate, 4,4-biphenylene diisocyanate, 1,5-naphthylene diisocyanate, ethylbenzene-2,4-diisocyanate, 4,4'-methylene-bis-(cyclohexylisocyanate), 4,4,4''-triphenylmethane triisocyanate, 1,3,5-benzene triisocyanate, 4,4'-methylene-bis-(phenylisocyanate), 4,4'-propylene-bis-(phenylisocyanate), and mixtures thereof.

The preparation of the above-described isocyanate-terminated prepolymer is well-known in the art, as is their use in the formation of polyurethane. Although the isocyanate-terminated prepolymers can have molecular weights from 200–10,000, it is generally preferred to prepare prepolymers having molecular weights in the range of 500–3,000.

The modifier employed in the present invention can be admixed with the isocyanate-terminated prepolymer but it is, in general, preferred to add the ester modifier to the reaction mixture resulting in the formation of the isocyanate-terminated prepolymer. The addition of the ester modifier does not affect the procedures heretofore developed for the formation of the isocyanate-terminated prepolymer. As indicated hereinabove, the ester modifier is added in nonplasticizing concentrations. This concentration will vary with the particular polyether employed. Thus, maximum improvement in mechanical properties may result at a higher concentration of ester modified with an extremely high molecular weight polyether as compared to the optimum modification in properties when a lower molecular weight polyether of the same formula is employed. Hence, the optimum concentration of ester modifier is generally established by experimental data employing varying concentrations of the ester modifier. As a general rule, however, the concentration of ester modified will be less than 30 percent of the modified isocyanate-terminated prepolymer composition and, generally, will be in the range of 5 to 20 percent by weight of the modified isocyanate-terminated prepolymer composition.

The compositions of the present invention are preferably formed by admixing the components, i.e., the polyisocyanate, the polyether, the modifier, and additional solvent, if any, at room temperature. Rapid formation of the modified isocyanate-terminated prepolymer occurs even at room temperature. If desired, the solvent can be removed after the reaction has been completed. Additives of the type heretofore employed in the formation of isocyanate-terminated prepolymers can also be employed in the process of the present invention. Such additives include tertiary amines, preferably trialkyl amines, which increase the curing rate of the prepolymer on contact with atmospheric moisture. Examples of suitable amines are: triethylamine, diethylcyclohexylamine, dimethyldodecylamine, dimethyloctadecylamine, and dimethylstearylamine. The prepolymer obtained can be directly employed as the resin vehicle in coating and laminating compositions. Pigments and other suitable coating additives can be incorporated into the prepolymer composition to make up the final coating or laminating composition. The coating compositions are applied to substrates in known manner and on exposure to the atmosphere, cure to hard, tough, cross-linked films at room temperature by reaction of the isocyanate groups in the prepolymer with the moisture in the atmosphere. The laminating compositions are employed in substantially the same way.

The invention is further illustrated by the following examples, in which all units of quantity are by weight unless otherwise stated.

EXAMPLE 1

Into a reaction flask equipped with an agitator is charged 25 parts of a polyhydric polyalkylene ether obtained by the reaction of 2,2,6,6-tetramethylolcyclohexanol and propylene oxide, said polyether having a hydroxyl number of about 510 and a molecular weight of about 550, as a 60 percent solution in butyl acetate. To the polyether solution is then added a solution of 15.5 parts of n-butyl acetate, 10 parts of dioctyl phthalate, and 35.7 parts of m-phenylene diisocyanate. To the resulting mixture is then added 0.1 part of benzoyl chloride as a reaction stabilizer, and the reaction mixture is agitated for a period of 3 hours at room temperature. An isocyanate-terminated prepolymer is obtained which has an isocyanate content of 9 percent.

The prepolymer composition is employed as the laminating resin to prepare 3-ply glass fabric laminates which are cured at room temperature in an atmosphere of 30–60 percent relative humidity over a period of 2–5 hour. The flexural strengths of the resulting laminates are measured employing a modified ASTM D-790-58-T test procedure.

The foregoing procedure is repeated employing no dioctyl phthalate; employing 24 parts of dioctyl phthalate; and employing 16 parts of dioctyl phthalate. The flexural strengths of the laminates prepared from these resins are illustrated and compared in Table I hereinbelow.

Table I

Dioctyl phthalate in percent of resin composition:

| | Flexural strength in p.s.i. |
|---|---|
| None | 12,300 |
| 10 | 29,900 |
| 16 | 27,000 |
| 24 | 19,000 |

EXAMPLE 2

Into a reaction flask equipped with agitator and heating means is charged 26.6 parts of polypropyleneglycol, a polyol commercially available as PPG-425, 6.0 parts of 1,3-butylene glycol, 18.0 parts of trimethylolpropane, 0.3 part of dibutyl-p-cresol, and 97.2 parts of hexyl acetate. The reaction mixture is refluxed and water of reaction is azeotropically removed. The reaction is continued until water distillation ceases. To the resulting polyhydric polyalkylene ether solution, maintained at a temperature of 120° F., is added 93 parts of 2,4-toluylene diisocyanate and the reaction mixture is heated for a period of 2 hours at 120°–150° F., after which 48.6 parts of ditridecyl phthalate is added to the reaction mixture. Heating is continued at 180°–190° F. until no further change in viscosity is observed. The resulting prepolymer composition is employed in the preparation of glass fiber laminate as described in Example 1. The flex strength of the resulting laminate is superior to that of the unmodified isocyanate-terminated prepolymer.

EXAMPLE 3

The procedure of Example 2 is repeated employing, instead of the ditridecyl phthalate, 48.6 of trioctyl trimellitate and similar beneficial results are observed.

The foregoing examples have illustrated the formation of the ester-modified isocyanate prepolymer composition of the present invention, and have illustrated the improved properties obtained by the use of the esters in nonplasticizing concentrations. It will be apparent that the esters included within the scope of the present invention but not specifically illustrated in the foregoing examples, can be similarly employed in these specific procedures illustrated and will result in similar improvements in mechanical properties of the cured isocyanate-terminated prepolymer.

Many variations and widely different embodiments will be apparent to those skilled in the polyurethane art and are intended to be included within the scope of the present invention as defined by the appended claims.

What is claimed is:

1. A stable, air-drying, isocyanate-terminated polyurethane prepolymer composition comprising the reaction product of (a) a polyhydric polyalkylene ether and (b) an excess of an organic polyisocyanate to provide at least 1.5 isocyanate groups for each hydroxyl group of said polyhydric polyalkylene ether, said composition containing from 10 to 16% by weight of the total composition of a hydrocarbon ester of a completely esterified polybasic acid, said ester being liquid at room temperature and boiling above 200° C.

2. The air-drying composition of claim 1 wherein the polybasic acid is an aromatic polycarboxylic acid.

3. The air-drying composition of claim 2 wherein the ester of the aromatic polycarboxylic acid is an alkyl ester.

4. The air-drying composition of claim 3 wherein the ester is an ester of a benzene dicarboxylic acid.

5. The composition of claim 1 wherein the polyalkylene ether is the reaction product of a polyol having at least three hydroxyl groups and an alkylene oxide, and the polyisocyanate is an aromatic diisocyanate.

6. The polyurethane composition obtained by air-drying the composition of claim 1.

7. The composition of claim 5 wherein the ester is a dialkyl phthalate ester.

8. The composition of claim 7 wherein the ester is dioctyl phthalate.

9. The composition of claim 1 wherein the hydrocarbon ester is added prior to the reaction of the polyhydric polyalkylene ether and the organic polyisocyanate.

10. The composition of claim 5 wherein the polyol is 2,2,6,6-tetramethylolcyclohexanol.

11. The composition of claim 1 wherein the polyhydric polyalkylene ether has a hydroxyl number of at least 450.

References Cited

UNITED STATES PATENTS

| 3,077,464 | 2/1963 | Simon et al. | 260—31.8 |
| 3,143,517 | 8/1964 | Heiss | 260—18 |

(Other references on following page)

OTHER REFERENCES

Smith et al., Journal of Applied Polymer Science, vol. 5, No. 14, pp. 218–232 (1961).

Bayer et al., Rubber Chemistry and Technology, vol. 23, No. 1, pp. 812–835 (1950).

1958 Book of ASTM Standards, Part 9, (Plastics, Electrical Insulation, Carbon Black), pp. 255–260 (1958).

DONALD E. CZAJA, *Primary Examiner.*

M. J. WELSH, *Assistant Examiner.*

U.S. Cl. X.R.

117—161; 260—30.6, 31.8; 161—190

U.S. DEPARTMENT OF COMMERCE
PATENT OFFICE
Washington, D.C. 20231

UNITED STATES PATENT OFFICE
CERTIFICATE OF CORRECTION

Patent No. 3,440,224                                April 22, 1969

Clarence N. Impola et al.

It is certified that error appears in the above identified patent and that said Letters Patent are hereby corrected as shown below:

Column 3, line 53, "azelic" should read -- azelaic --; line 59, "14-dicarboxylic" should read -- 1,4-dicarboxylic --. Column 4, line 27, "number" should read -- numbers --; lines 66 and 73 "modified" should read -- modifier --. Column 5, line 50, "hour" should read -- hours --. Column 6, line 18, "48.6 of trioctyl" should read -- 48.6 parts of trioctyl --.

Signed and sealed this 12th day of May 1970.

(SEAL)
Attest:

Edward M. Fletcher, Jr.
Attesting Officer

WILLIAM E. SCHUYLER, JR.
Commissioner of Patents